US012079467B2

United States Patent
Galu, Jr.

(10) Patent No.: US 12,079,467 B2
(45) Date of Patent: Sep. 3, 2024

(54) RADIAL BASED USER INTERFACE ON TOUCH SENSITIVE SCREEN

(71) Applicant: Texas Instruments Incorporated, Dallas, TX (US)

(72) Inventor: James Joseph Galu, Jr., Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/844,719

(22) Filed: Jun. 21, 2022

(65) Prior Publication Data

US 2022/0317874 A1   Oct. 6, 2022

Related U.S. Application Data

(63) Continuation of application No. 14/226,794, filed on Mar. 26, 2014, now Pat. No. 11,422,695.

(Continued)

(51) Int. Cl.
*G06F 3/04886*   (2022.01)
*G06F 3/0482*   (2013.01)
(Continued)

(52) U.S. Cl.
CPC ........ *G06F 3/04886* (2013.01); *G06F 3/0482* (2013.01); *G06F 3/04845* (2013.01); *G06F 3/04883* (2013.01); *G06F 2203/04808* (2013.01)

(58) Field of Classification Search
CPC .............. G06F 3/04886; G06F 3/0482; G06F 3/04845; G06F 3/04883; G06F 2203/04808
See application file for complete search history.

(56) References Cited

U.S. PATENT DOCUMENTS 5,281,966 A   1/1994  Walsh
5,982,302 A   11/1999 Ure
(Continued)

FOREIGN PATENT DOCUMENTS

WO   2008100121 A1   8/2008

OTHER PUBLICATIONS

Mark Wilson, "A Farmous Inventor's Forgotten Idea: A One-Handed Touch-Screen Keyboard", pp. 1-3, Feb. 14, 2012, available at www.fastcodesign.com/1669042/a-famous-inventors-forgotten-idea-a-one-handedtouch-screen-keyboard on Mar. 25, 2014.

(Continued)

*Primary Examiner* — Tadesse Hailu
(74) *Attorney, Agent, or Firm* — Charles F. Koch; Frank D. Cimino

(57) ABSTRACT

A radial based user interface (UI) is provided for entering data into a computer device. The radial based UI has a central region with a plurality of radial regions. A location for the central region is defined on a touch sensitive display screen of the device and a value is assigned to each radial region. When a first touch is detected in the central region of the radial UI, an indication of a radial position responsive to a second touch on the touch sensitive screen may be determined. A value corresponding to the radial position of the second touch may then be input to an application being executed on the device. The first and second touches may be two separate finger taps, or may be sequential portions of a continuous stroke that occurs along one of the plurality of radial regions.

20 Claims, 12 Drawing Sheets

Related U.S. Application Data

(60) Provisional application No. 61/805,597, filed on Mar. 27, 2013.

(51) Int. Cl.
*G06F 3/04845* (2022.01)
*G06F 3/04883* (2022.01)

(56) References Cited

U.S. PATENT DOCUMENTS

| | | | |
|---|---|---|---|
| 6,756,969 B2 | 6/2004 | Nuovo et al. | |
| 7,286,115 B2 | 10/2007 | Longe et al. | |
| 7,676,036 B2 | 3/2010 | Takasaki et al. | |
| 7,778,818 B2 | 8/2010 | Longe et al. | |
| 9,104,308 B2* | 8/2015 | Au | G06F 3/04883 |
| 9,176,480 B2* | 11/2015 | Sadilek | G06F 3/04886 |
| 9,250,800 B2* | 2/2016 | Yano | G06F 3/04883 |
| 9,261,989 B2* | 2/2016 | Kuscher | G06F 3/04883 |
| 9,342,217 B2* | 5/2016 | Geithner | G06F 3/04817 |
| 2006/0117067 A1* | 6/2006 | Wright | G06F 16/338 |
| | | | 707/E17.093 |
| 2007/0086825 A1 | 4/2007 | Min | |
| 2008/0307945 A1* | 12/2008 | Gatzsche | G10H 1/38 |
| | | | 84/477 R |
| 2009/0327964 A1* | 12/2009 | Mouilleseaux | G06F 3/04883 |
| | | | 715/834 |
| 2010/0019940 A1 | 1/2010 | Oh | |
| 2010/0026625 A1* | 2/2010 | Oh | G06F 3/0338 |
| | | | 345/156 |
| 2010/0192102 A1* | 7/2010 | Chmielewski | G06F 3/0488 |
| | | | 715/834 |
| 2010/0192103 A1* | 7/2010 | Cragun | G06F 3/0488 |
| | | | 715/834 |
| 2010/0245244 A1* | 9/2010 | Oh | G06F 3/04883 |
| | | | 345/158 |
| 2010/0266323 A1 | 10/2010 | Min | |
| 2010/0306702 A1* | 12/2010 | Warner | G06F 3/0482 |
| | | | 715/834 |
| 2011/0265041 A1* | 10/2011 | Ganetakos | A63F 13/533 |
| | | | 715/834 |
| 2012/0226978 A1* | 9/2012 | Harberts | G06F 3/0485 |
| | | | 715/702 |
| 2012/0262386 A1* | 10/2012 | Kwon | G06F 3/04886 |
| | | | 345/173 |
| 2013/0033448 A1* | 2/2013 | Yano | G06F 3/018 |
| | | | 345/173 |
| 2013/0104079 A1* | 4/2013 | Yasui | G06F 3/0482 |
| | | | 715/834 |
| 2013/0127911 A1* | 5/2013 | Brown | G06F 3/04886 |
| | | | 345/173 |
| 2013/0132904 A1* | 5/2013 | Primiani | G06F 3/0482 |
| | | | 715/834 |
| 2013/0167085 A1* | 6/2013 | Roundtree | G06F 3/0488 |
| | | | 715/810 |
| 2014/0071063 A1* | 3/2014 | Kuscher | G06F 3/04883 |
| | | | 345/173 |

OTHER PUBLICATIONS

"Chorded keyboard", Wikipedia, pp. 1-8, last modified Aug. 23, 2013 available at http://en.wikipedia.org/w/index.php?title=Chorded_keyboard&old:d=569869550 on Mar. 25, 2014.

Trevor, "Smart phone chorded keyboard", Trevor's Trinkets, pp. 1-6, Jul. 3, 2011, available at http://trevors-trinkets.blogspot.com/2011/07/smart-phone-chorded-keyboard.html on Mar. 25, 2014.

Lambert Varias, "Virtual Chorded Keyboard for Tablets: Piano Prose," Feb. 12, 2012, http://technabob.com/blog/2012/02/12/chorded-keyboard-for-tablets/, 3 pages.

Teague Labs, "Doug Engelbart's Chorded Keyboard as a Multi-touch Interface," Feb. 8, 2012, http://labs.teague.com/?p=1451&cpage=1, pp. 1-4.

\* cited by examiner

RADIAL BASED USER INTERFACE ON TOUCH SENSITIVE SCREEN

CROSS REFERENCE TO RELATED APPLICATIONS

The present application is a Continuation of U.S. patent application Ser. No. 14/226,794, filed Mar. 26, 2014, which claims priority to and incorporates by reference U.S. Provisional Application No. 61/805,597, filed Mar. 27, 2013, entitled "CHORDED BINARY BASED HUMAN INTERFACE TO MULTITAP CAPABLE DEVICES" all of which are hereby incorporated herein in their entireties.

BACKGROUND OF THE INVENTION

Field of the Invention

Embodiments of the present invention generally relate to a user interface on a device with a touch screen, and in particular to a user interface that supports data input by multiple finger taps.

Description of the Related Art

A touch screen is an electronic visual display that a user may control through simple or multi-touch gestures by touching the screen with one or more fingers. Some touch screens can also detect objects such as a stylus or ordinary or specially coated gloves. The user may use the touch screen to react to what is displayed and to control how it is displayed, for example, by zooming the text size.

The touch screen enables the user to interact directly with what is displayed, rather than using a mouse, touchpad, or any other intermediate device, other than a stylus, which is optional for most modern touch screens.

Touch screens are common in devices such as game consoles, all-in-one computers, tablet computers, and smart phones. They can also be attached to computers or, as terminals, to networks. They also play a prominent role in the design of digital appliances such as personal digital assistants (PDAs), satellite navigation devices, mobile phones, and video games, for example.

The popularity of smart phones, tablets, and many other types of information appliances is driving the demand and acceptance of common touch screens for portable and functional electronics. Touch screens are popular in the medical field and in heavy industry, as well as in kiosks such as museum displays or room automation, where keyboard and mouse systems do not allow a suitably intuitive, rapid, or accurate interaction by the user with the display's content.

Various technologies have been used for touch screens, including: resistive layers separated by a space, surface acoustic waves, various forms of capacitance coupling, infrared emitters and detectors, optical imaging, acoustic pulse detection, etc.

SUMMARY

A radial based user interface (UI) is provided for entering data into a computer device. The radial based UI has a central region with a plurality of radial regions. A location for the central region is defined on a touch sensitive display screen of the device and a value is assigned to each radial region. When a first touch is detected in the central region of the radial UI, an indication of a radial position responsive to a second touch on the touch sensitive screen may be determined. A value corresponding to the radial position of the second touch may then be input to an application being executed on the device. The first and second touches may be two separate finger taps, or may be sequential portions of a continuous stroke that occurs along one of the plurality of radial regions.

BRIEF DESCRIPTION OF THE DRAWINGS

Particular embodiments in accordance with the invention will now be described, by way of example, and with reference to the accompanying drawings.

DETAILED DESCRIPTION OF EMBODIMENTS OF THE INVENTION

Figure 1:
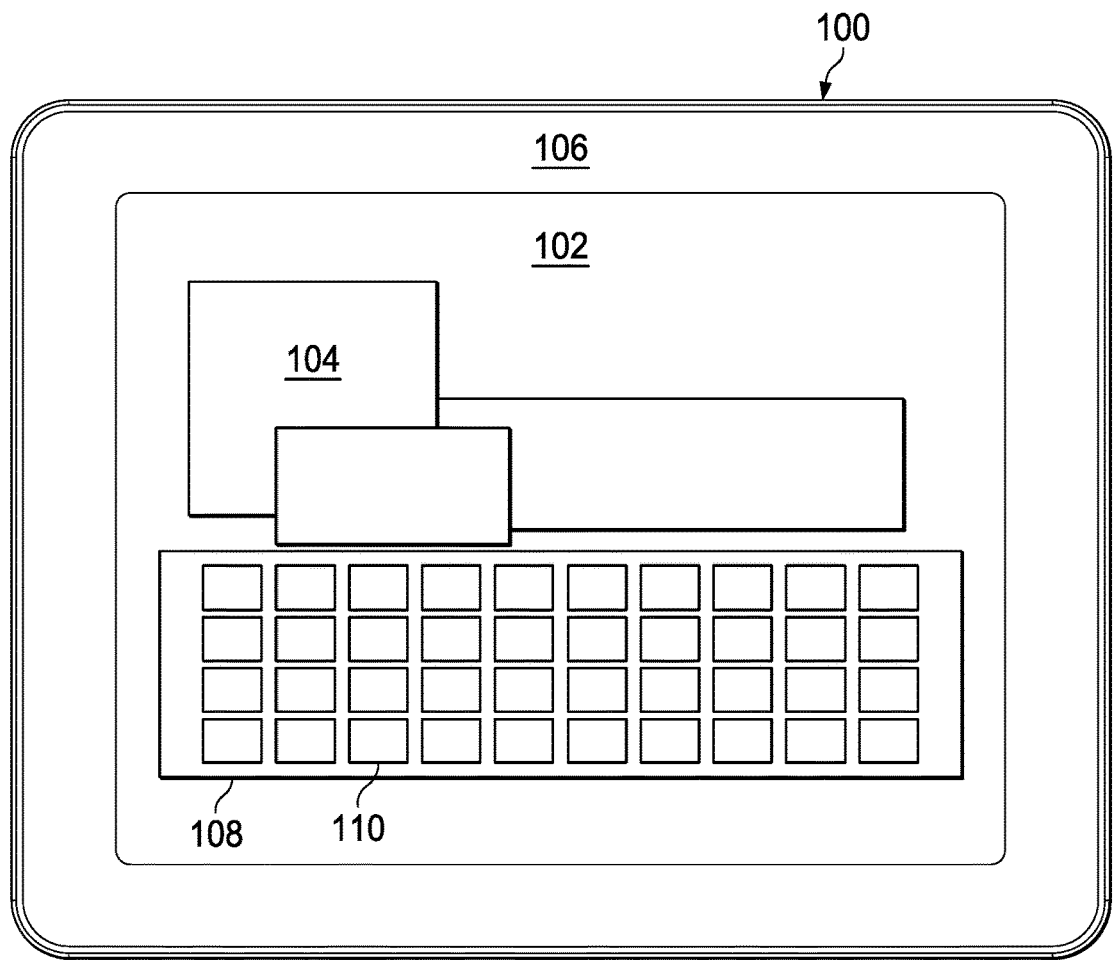
FIGS. 1-2 illustrate an example device that is equipped with a touch screen display.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skills in the art that the invention may be practiced without these specific details. In other instances, well-known features have not been described in detail to avoid unnecessarily complicating the description.

Embodiments of the present invention are discussed below with respect to an embodiment on a tablet computer that contains software applications that provide functionality that is similar to a hand held graphing calculator. It should be noted, however, that embodiments of the present invention may be useful for software applications other than calculator applications. It should also be noted that embodiments of the present invention may be useful for other types of electronic devices with touch screens, such as: laptop computers, desktop computers, handheld computing devices, wrist mounted devices, vehicle mounted devices, wall mounted devices, etc., for example. Examples of other types of handheld computing devices in which embodiments of the present invention may be useful include: scientific calculators, advanced calculators able to upload and run software applications, handheld-sized limited-purpose computer devices, handheld-sized educational computer devices, handheld-sized portable computer devices, portable computer devices, personal digital assistants (PDAs), palmtop computers, cellular or mobile telephones, and any combination thereof, for example.

Touch screen devices offer unique interface advantages, but the human interface for data entry is inferior to physical keys. The virtual keyboard takes up precious display space, and the keys are often squeezed tightly together.

Embodiments of the invention provide a radial based alpha numeric interface for data entry into touch sensitive devices. Numbers and characters may be mapped to various radial locations relative to a central region of the screen. One or more fingers may touch the screen to convey radial direction relative to the central region of the screen and thereby select a number or character corresponding to the conveyed radial direction. This scheme works well for number entry and is well suited for calculator or spreadsheet applications. However, various embodiments may also use radial based inputs for other types of data entry, such as alpha-numeric data, for example.

FIG. 1 shows an example notepad computer 100 that includes one or more applications that may receive data input via a radial based virtual user interface, as described in more detail below. As opposed to the known technique of entering data via a virtual standard keyboard, embodiments allow rapid data entry using multiple touches to select radial positions on a touch sensitive display screen. As shown in FIG. 1, notepad computer 100 includes a graphical display 102 that may be used to display, among other things, information input to applications executing on the handheld tablet 100 and various outputs of the applications. For example, each application may use one or more windows 104 for displaying input and output information, as is well known in computer technology. The graphical display 102 may be, for example, an LCD display. One or more control buttons (not shown) may be provided in some embodiments, such as a power button, volume control buttons, etc.

Display 102 includes touch detection circuitry that allows a user to interact with the display 102 by translating the motion and position of the user's fingers on the display 102 to provide functionality similar to using an external pointing device, such as a mouse, and a keyboard. A user may use the touch sensitive display 102 to perform operations similar to using a pointing device on a computer system, e.g., scrolling the display 102 content, pointer positioning, selecting, highlighting, etc. The general operation of a touch sensitive display screen is well known and need not be described in further detail herein. For example, in some embodiments, a detection circuitry may be located in a peripheral region 106 around the touch sensitive screen. In other embodiments, transparent circuitry may be formed on the face of the screen that detects the presence and location of a finger or pointing instrument that is placed near or in contact with the surface of the screen, etc. Embodiments of the invention that may be used with many types of currently known or later development touch sensitive screens. Notepad computer 100 may not have a dedicated keyboard; instead, one or more applications may provide a virtual, or a "soft keyboard" as illustrated by application window 108 that includes a set of keys 110. However, as will be described in more detail below, embodiments of the invention may perform data entry using a non-obtrusive radial based user interface in place of virtual keyboard 108 so that more screen area is available for user applications.

Figure 2:
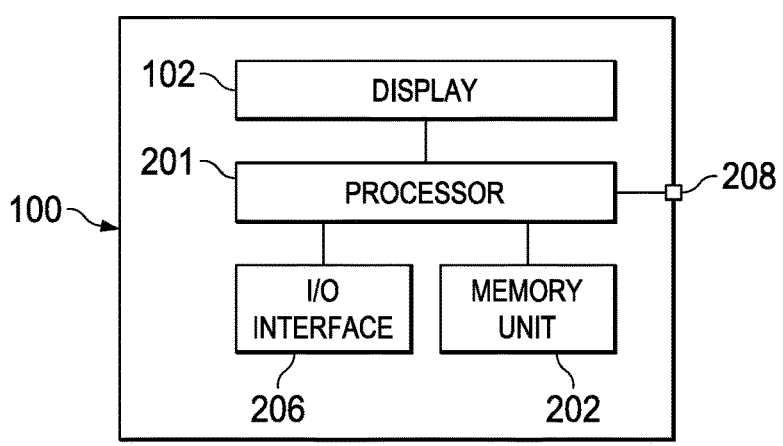

FIG. 2 is a simplified block diagram of notepad computer 100. Notepad computer 100 includes a processor 201 coupled to a memory unit 202, which may include one or both of read-only memory (ROM) and random-access memory (RAM). In some embodiments, the ROM stores software programs implementing functionality described herein and the RAM stores intermediate data and operating results.

Touch sensitive display 102 includes control and interface circuitry and is controllably coupled to processor 201 so that touch location input data may be provided to processor 201. An input/output port 208 may provide connectivity to external devices. Input/output port 208 may be a bi-directional connection such as a mini-A USB port, for example. Also included in the notepad computer 100 may be an I/O interface 206. The I/O interface 206 provides an interface to couple input devices such as power control and volume control buttons, for example, to processor 201. In some embodiments, the notepad computer 100 may also include an integrated wireless interface (not shown) or a port for connecting an external wireless interface (not shown).

FIGS. 3-6 illustrate one embodiment for entering data into the device of FIG. 1 using two fingers and a radial based user interface (UI). In this embodiment, a user would envision an analog clock layout 300 on the screen 102 with 12 o'clock oriented at the top of the screen and adjusting to the device's perspective and orientation. The normal clock positions may be assigned similar data values. One o'clock position 311 may represent the digit "1", two o'clock position 312 may represent the digit 2, etc., for example. Eleven o'clock position 320 and twelve o'clock position 321 may be assigned various control functions, such as "shift" and "back," for example. The center portion 310 of clock-face target 300 may be assumed to be located in a central portion of screen 102. In this manner, an actual user interface (UI) would not need to be displayed since the user can easily visualize the location of the center and radial positions of the clock-faced target.

The 11 or 12 o'clock positions could be used to indicate a "Back", "Shift", or "Control" key which would allow the user to input other alphanumeric characters, static symbols, and controls. For example, selecting "shift" or "control" may cause a different set of numbers or characters to be assigned to one or more of the radial clock-face locations.

Figure 4:
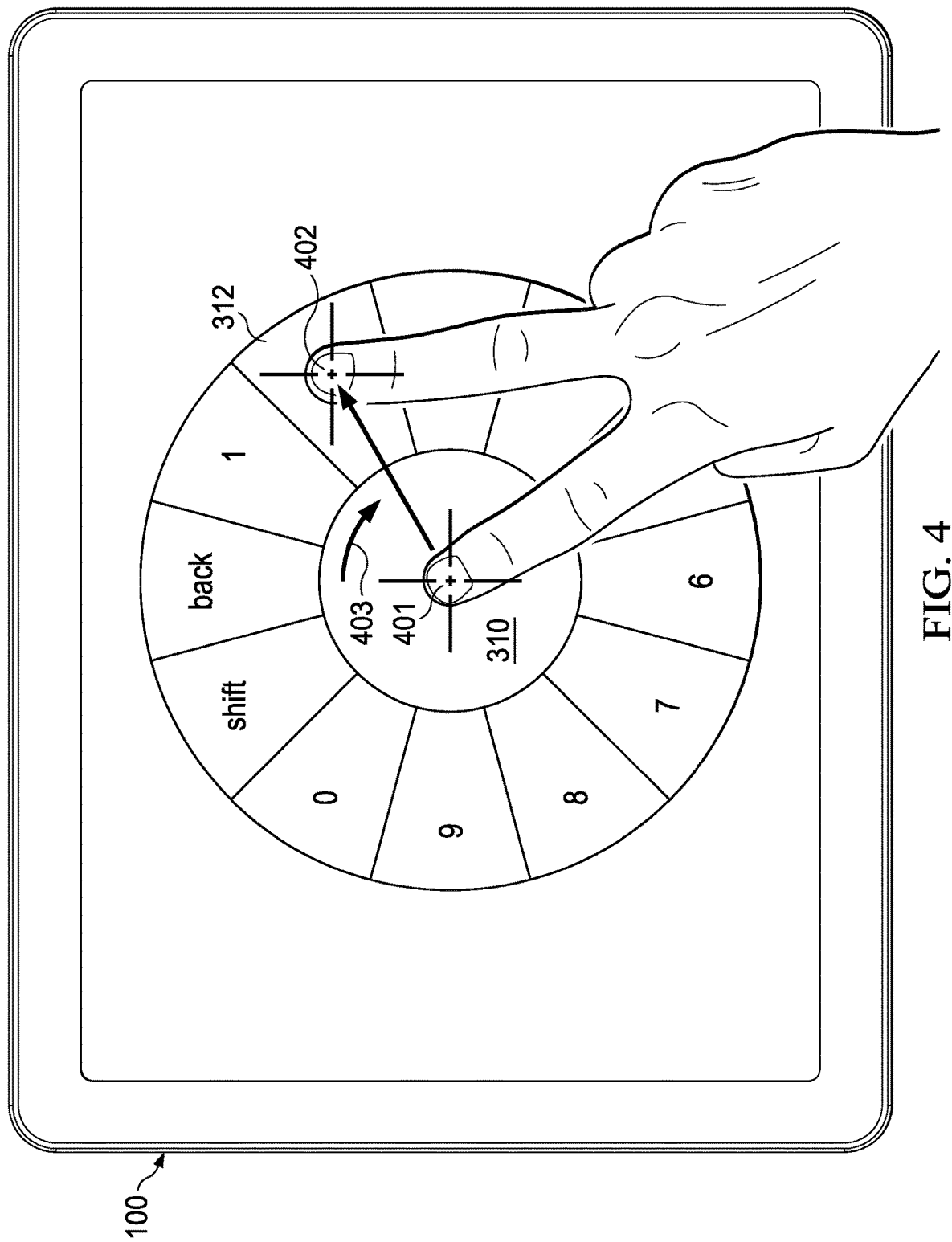

Referring to FIG. 4, a user may input numbers by placing one finger 401 at the very center of the screen (center of the clock 310) and another finger 402 at the location of the number representing the desired input, in this example the number "2" as defined by clock-face region 312. These two fingers would tap the screen at precisely the same time to generate a numeric input based on the radial relationship 403 between the finger in central region 310 and the other finger.

Figure 5:
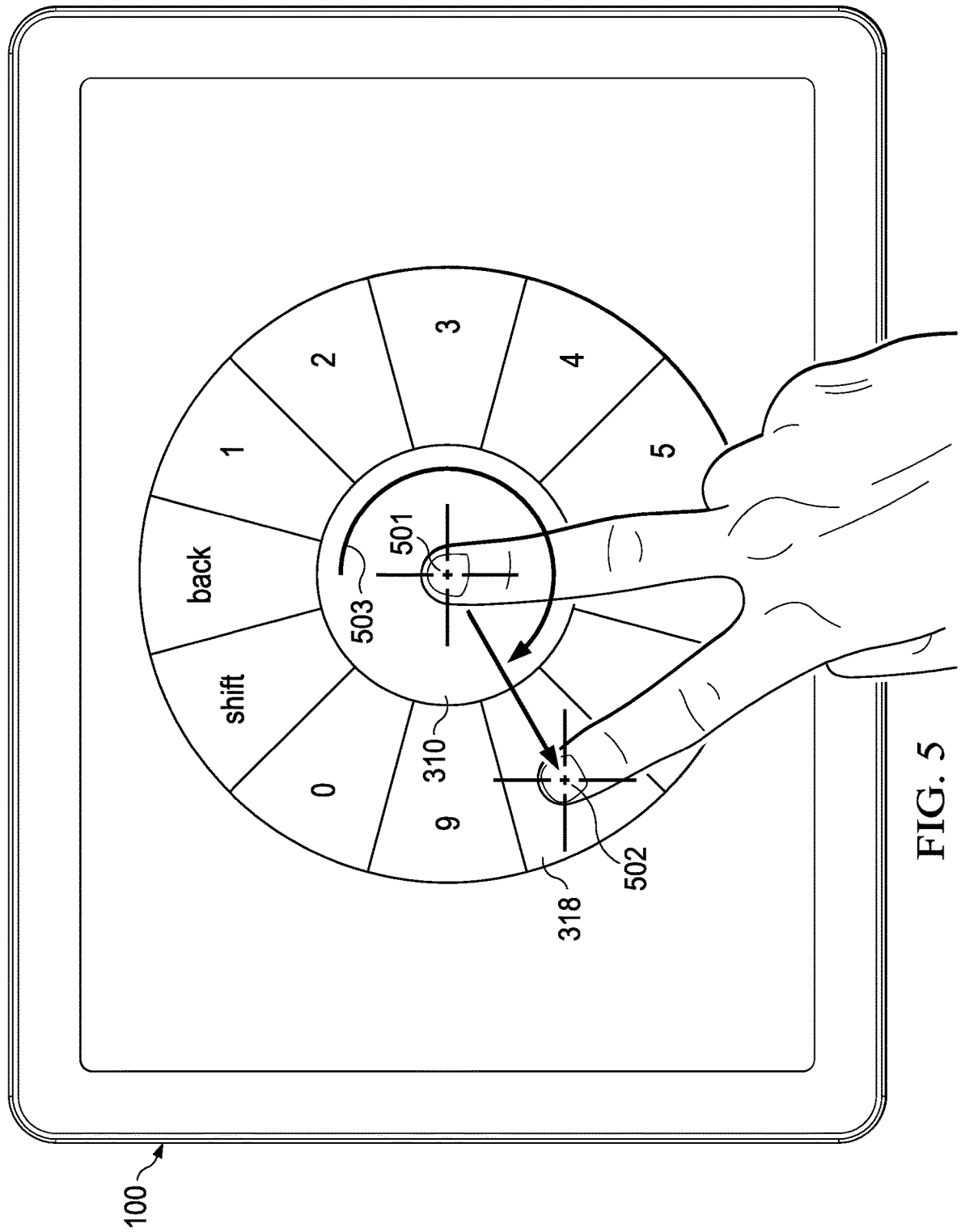

Referring to FIG. 5, the user may input another number in which a different finger 501 is positioned in the center of the screen and a second finger 502 is placed at the location of the number representing the desired input, in this example the number "8" as defined by clock-face region 318. In this manner, the user has freedom to select numbers and functions from around the radial pattern using various combinations and placement of fingers, as long as one finger is positioned in the center of the screen to convey that a radial based data entry operation is being performed. Whichever finger tap is closer to the center of the display may be treated as the center of the radial UI and the radial position of the other finger tap may be referenced to the central finger tap, as illustrated by radial indication 503. In this manner, the location of central region of the radial UI may be dynamically redefined to correspond approximately to a location of a most central one of the two taps.

Figure 6:
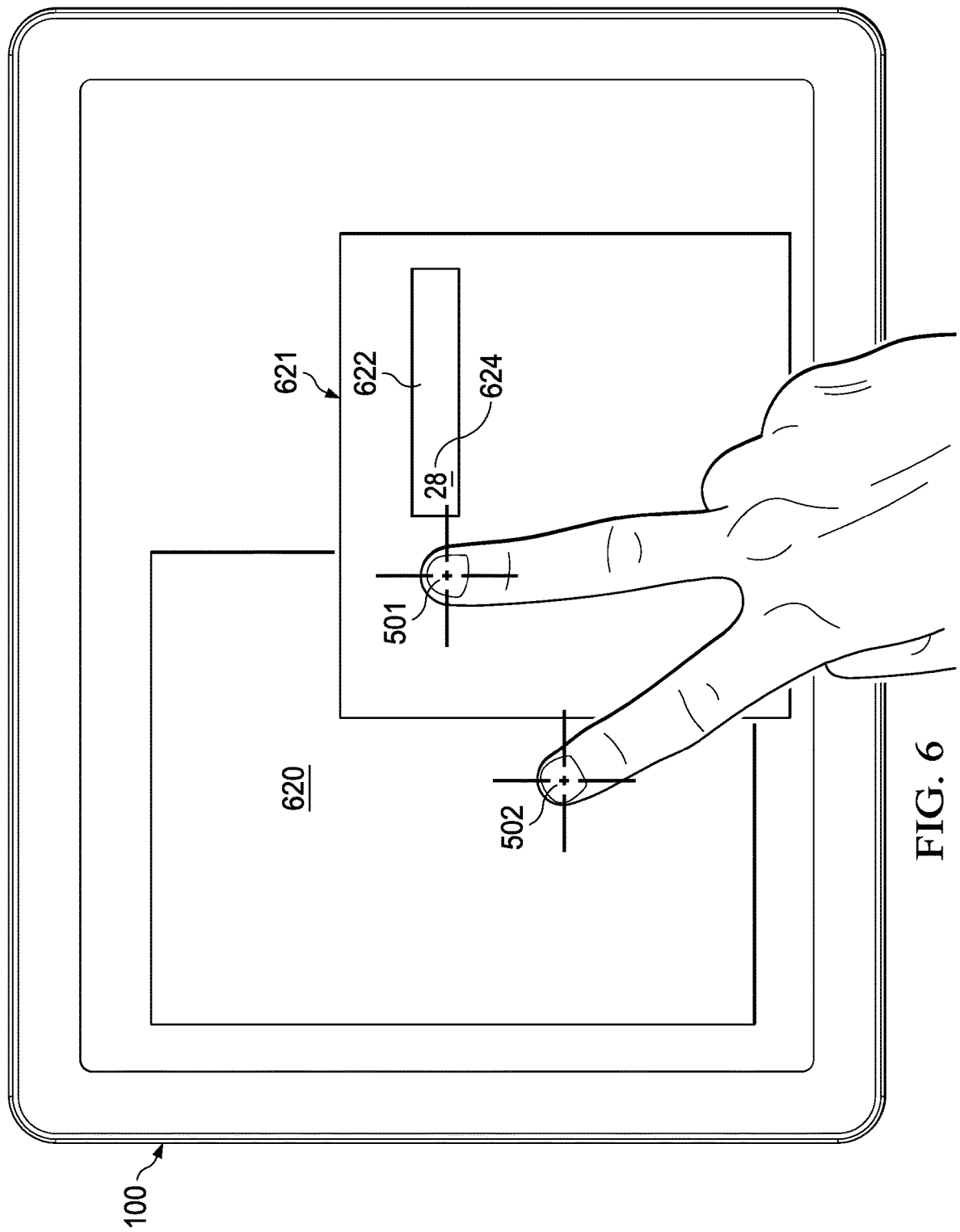

Referring to FIG. 6, the result of the previous two data entry operations is illustrated. In this example, one or more application windows 620, 621 are being displayed on the screen of device 100. The user may be entering data into a field in one of the applications, such as field 622, for example. In this example, fingers 501, 502 have selected a value of "8" as explained above with regard to FIG. 5, and "8" is therefore entered into field 622, as illustrated at 624.

As mentioned above, an actual UI does not need to be displayed since the user can easily visualize the location of the center and radial positions of the clock-faced target. This allows the user to see more screen space and allows the user to quickly and accurately enter numbers. Assuming common familiarity with clock number positions, this interface should be intuitive to the user and minimize the learning curve.

Figure 7:
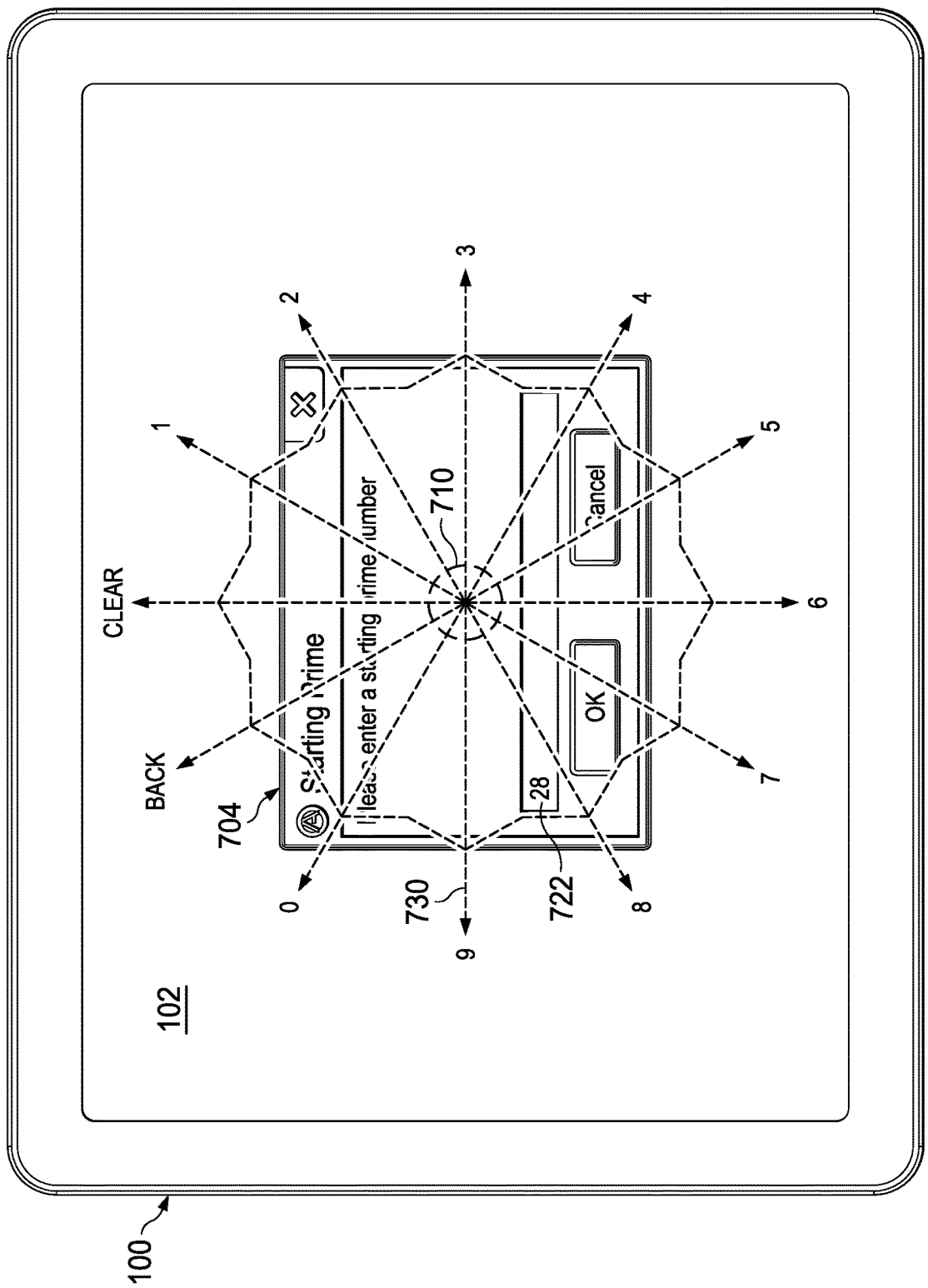
FIG. 7 illustrates one example of a radial based template that may overlay a user display.

FIG. 7 illustrates one example of a radial based template 730 that may overlay a user display. It may be desirable in some embodiments to provide an overlay of a radial based user interface to aid a user in entering data. The overlay may be minimal so as not to obstruct viewing the underlying application. In this example, template 730 is overlaid over application window 704, and the numbers "28" have been entered into date entry field 722 in a manner similar to that described above, for example. In this example, simple dashed lines indicate center region 710 and each radial position of the radial based user interface. In another embodiment, an overlay similar to the clock face of FIG. 3 may be used, for example. These example templates are by no means limiting; various shapes, sizes, and configurations of a radial UI may be overlaid on a device screen.

FIG. 7 also illustrates that when a radial UI template is used, the template does not necessarily need to be placed in the center of the display. In this example, template 730 is positioned towards an edge of display screen 102, for example.

Template 730 may be displayed in response to user input to device 100. For example, an application may display a radial UI template in response to a user selecting to enter data into a field of an application. Alternatively, a radial UI template may be displayed in response to detecting two simultaneous finger taps, for example. Other triggers may be defined that may cause a radial UI to be displayed, depending on what application is active on a device.

Figure 8:
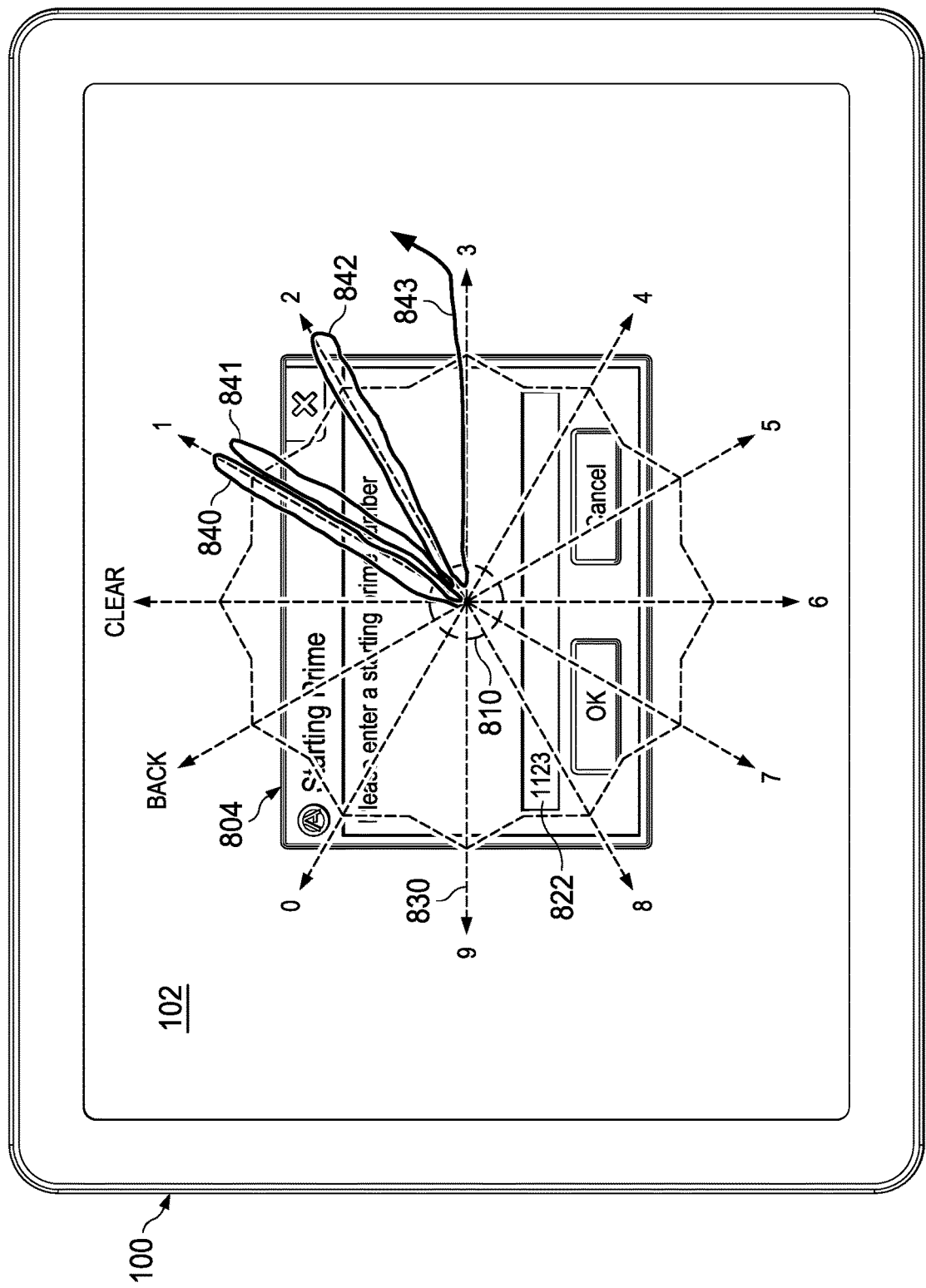
FIG. 8 illustrates entering data into the device of FIG. 1 using one finger and a radial based user interface.

FIG. 8 illustrates entering data into the device of FIG. 1 using one finger and a radial based UI 830. A single stroke or swipe 840 from the center location 810 and in the general direction of a corresponding radial angle (or hour hand number position) may be used as an alternative to the two tap input described above. In this case, a first portion of the stroke corresponds to a first tap and occurs in the central region 810 of the radial UI, and a second portion of the continuous stroke corresponds to a second tap and occurs along one of the plurality of radial regions.

A series of strokes 840-843 that originate from the center 810 and move to a number position in a radial manner and then back to the center may be used to string multiple characters (typically integers) into the targeted input control field.

Figure 9:
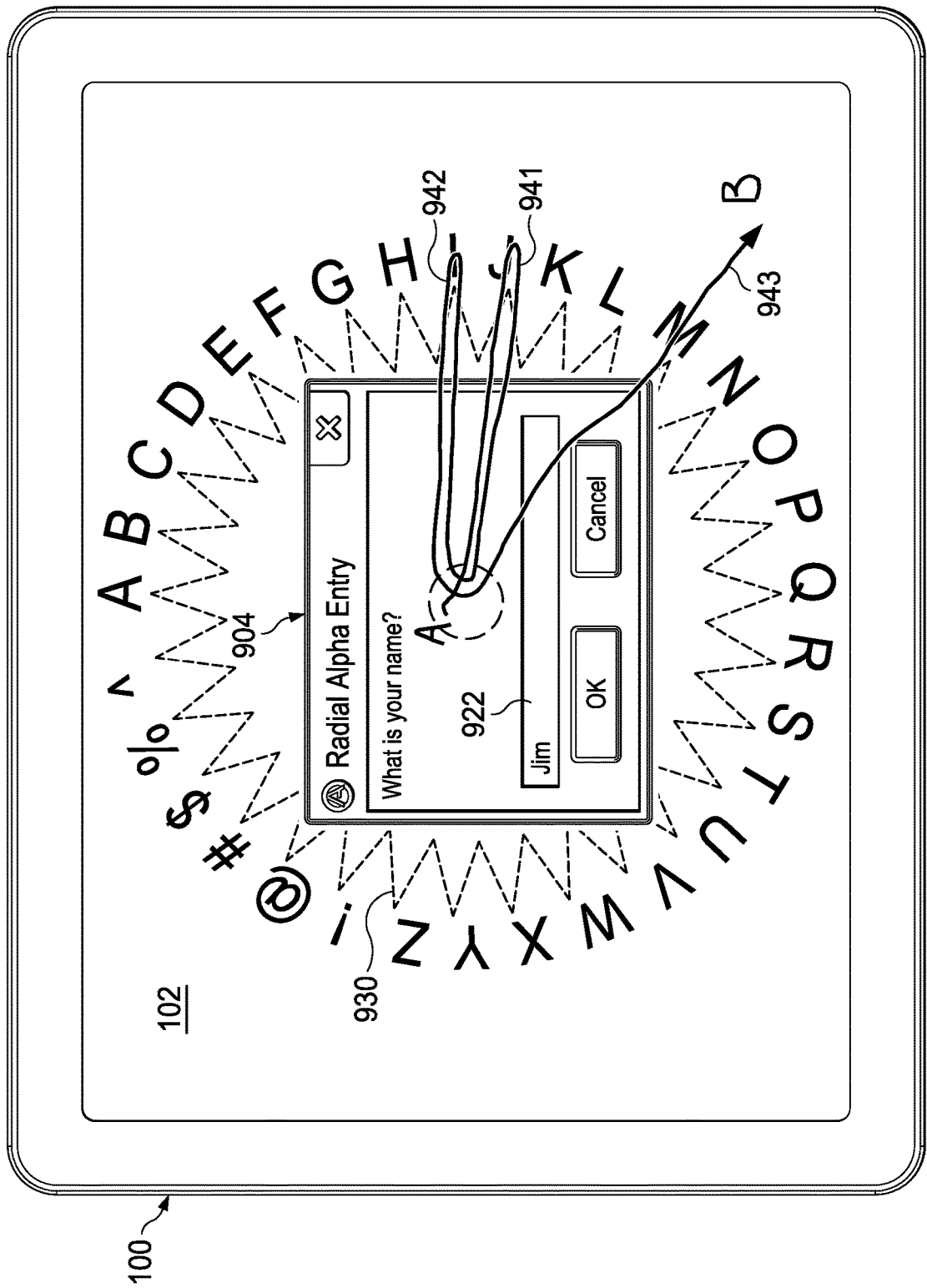
FIG. 9 illustrates a radial UI with more than twelve positions.

FIG. 9 illustrates a radial UI 930 with more than twelve positions. In this example, a more extensive template may be overlaid on display screen 102 that may include all of the letters of the alphabet and misc symbols, for example. In is similar manner as described above, a series of strokes 941-943 may enter the word "Jim" in data entry field 922 of application window 904, for example.

Alternatively, the same template may be used for two finger entry as described with regard to FIGS. 3-6 using the more extensive template 930, for example.

Figure 10:
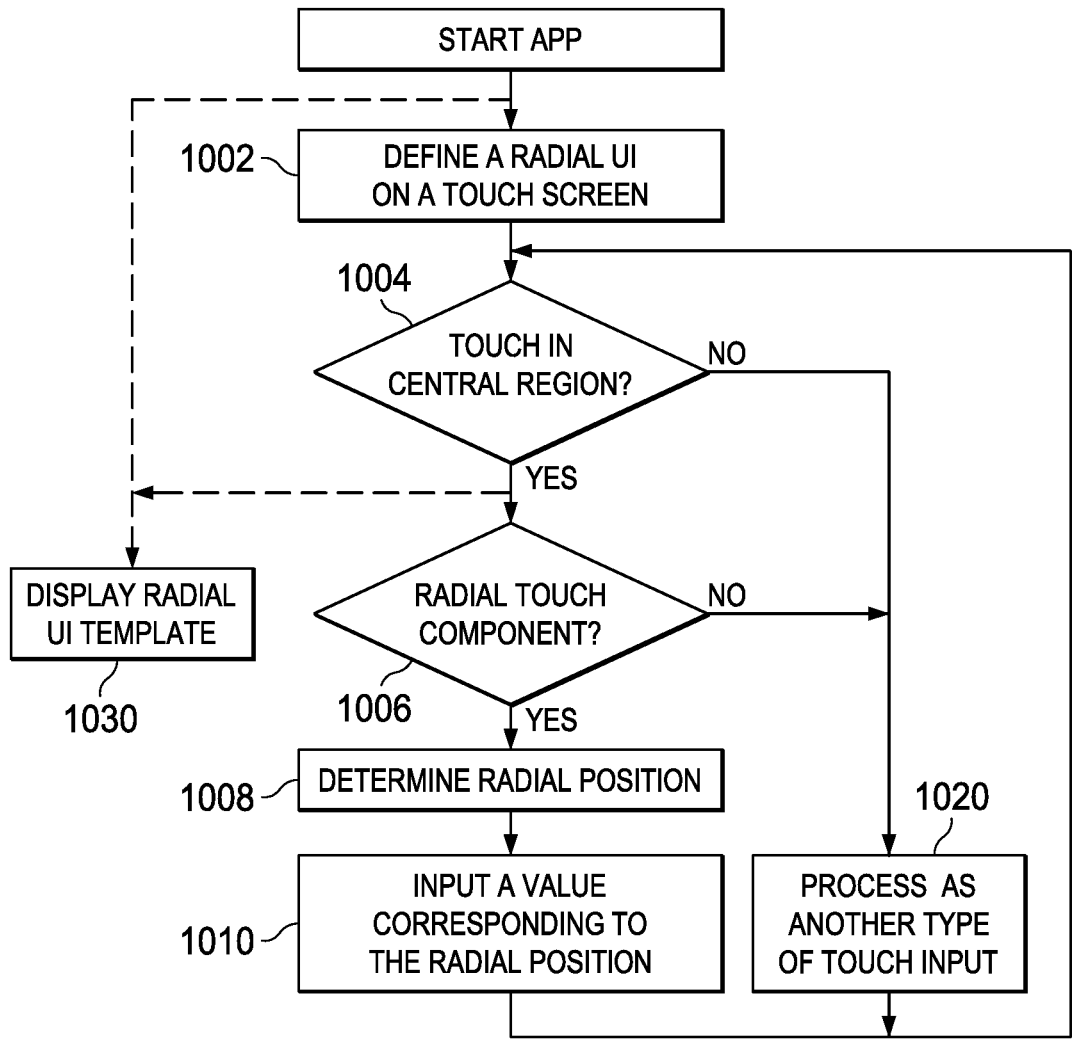
FIG. 10 is a flow diagram illustrating entering data into a device using a radial user interface.

FIG. 10 is a flow diagram illustrating entering data into a device having a touch sensitive screen using a radial user interface, as described above with regard to FIGS. 3-9. As described above in more detail, a location of a central region of a radial based user interface (UI) with a plurality of radial regions is defined 1002 on the touch sensitive display screen of the device. A value is assigned to each radial region. As described above, the radial UI may mimic an analog clock with twelve positions. Alternatively, it may have a fewer number of radial positions for a more restricted set of data items or a larger number of radial positions to accommodate letters or some combination of letters, symbols and/or numbers, for example.

As described above in more detail, the center region of the radial based UI may be positioned at the center of the display for an intuitive radial UI in which a UI template is not displayed. Alternatively, a radial UI template may be displayed 1030 and positioned anywhere on the display screen. In either case, radial positions will be referenced to the center region of the radial UI.

Each time a touch is detected on the touch sensitive display screen, a check 1004 is made to see if the detected touch occurred in the central region of the radial UI. If not, the detected touch may be processed 1020 as another type of input to the device. In the case where a radial UI template is not displayed, it may be assumed that when a touch is detected in the center of the display screen that it may be intended as a radial UI input.

If a radial touch component is not received 1006, then a touch in the central region is treated 1020 as another type of input to the device. When a radial touch component is received 1006, then a determination 1008 of a radial position responsive to the radial touch component on the touch sensitive screen performed. As described above in more detail, the radial UI touch inputs may be two separate touches, or may be a first touch followed by continuous stroke motion in a radial direction. In the case of two essentially simultaneous touches in which one touch is located within the central region of the radial UI, the placement of the other touch relative to the central touch provides the radial position. In the case of a stroke that originates in the central region of the radial UI, the direction of the stroke provides the radial position.

A value corresponding to the radial position may then be input 1010 to a data entry field of an application being executed on the device. The data input field may be any type of field that may accept data for an application being executed on the device.

Figure 3:
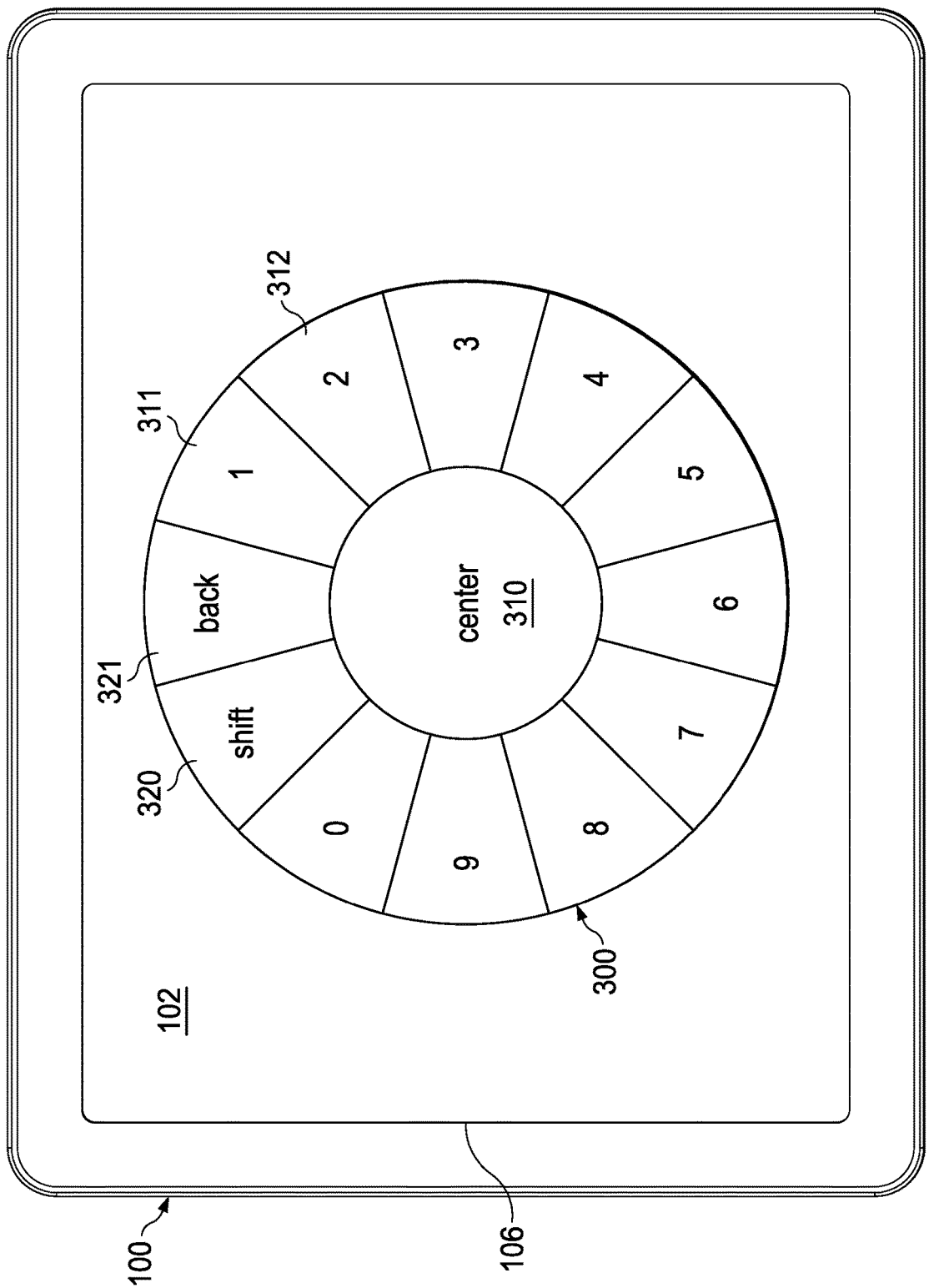
FIGS. 3-6 illustrate entering data into the device of FIG. 1 using two fingers and a clock-face target.

As described above, in some embodiments, a radial UI template, such as illustrated in FIG. 3, 7 or 9 may be displayed 1030 on the display screen of the device. Typically, the template is transparently overlaid on an application window that is active on the display screen. Various schemes may be used to invoke a display of the radial UI template. In some embodiments, the template may be displayed in response to a particular application being active. In this case, the radial UI may be used to enter data into the application. In another embodiment, the template may be displayed in response to detection of a pair of taps, for example. In another embodiment, the template may be displayed in response to an overt request or menu selection by a user, for example.

Figure 11:
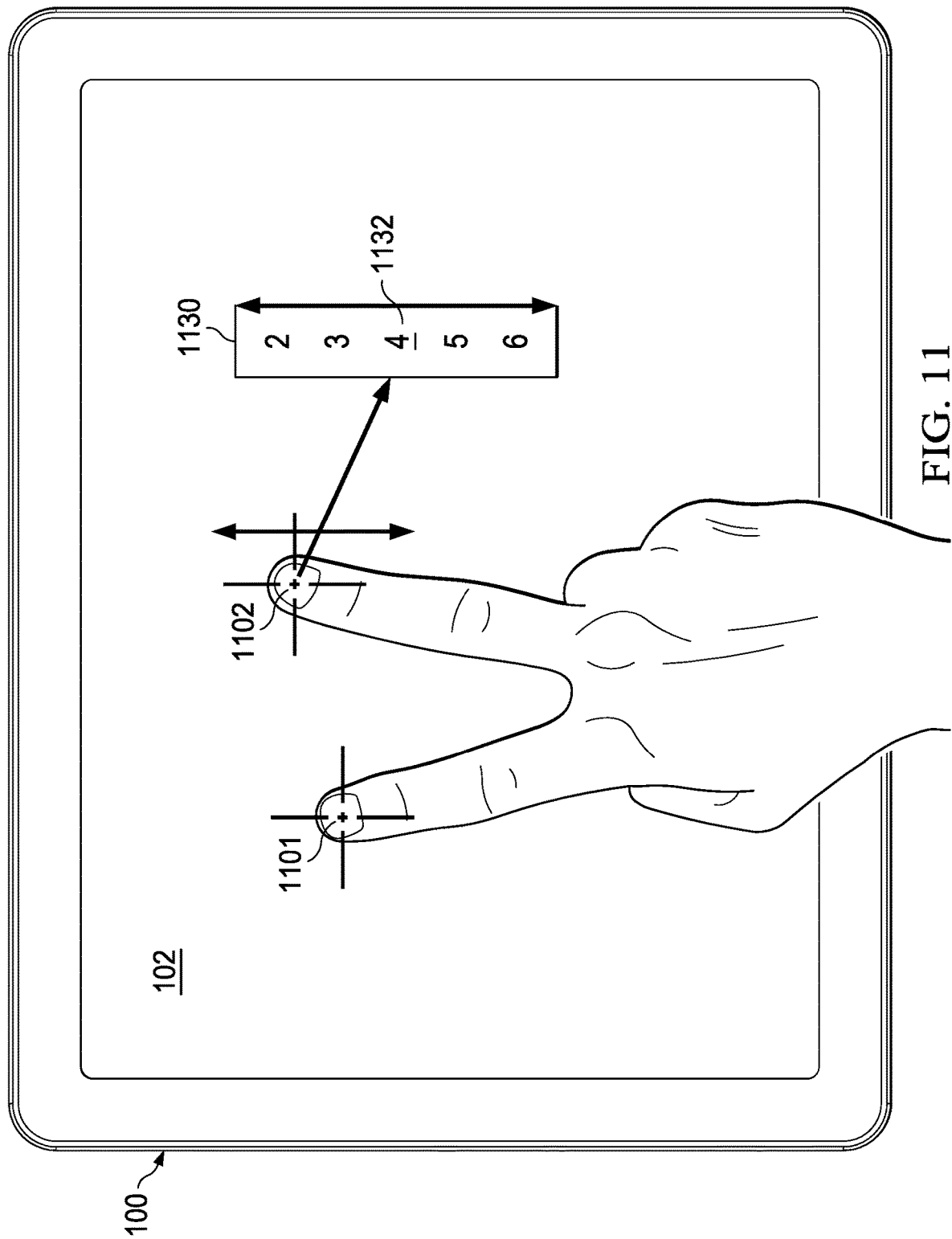
FIG. 11 illustrates entering data into the device of FIG. 1 using multiple fingers with a tap and slide finger motion.

FIG. 11 illustrates an alternative technique for entering data into the device of FIG. 1 using multiple fingers with a tap and slide finger motion. A tap and slide alphanumeric entry system may be used on a multi-touch capable device to enter numeric or alphanumeric data in a simpler and/or less obtrusive manner than using a virtual keyboard.

In this scheme, one finger 1101 (typically the index finger) taps and holds the finger on the screen to indicate the desire to input text. A second finger 1102, typically the middle finger, then slides up and down on the screen to rotate through a virtual wheel 1130 of possible characters to enter. Wheel 1130 may be visualized as a wheel that is oriented perpendicular to the display that has characters positioned around its edge. The characters on the edge roll into view and then roll out of view as the wheel rotates. The tap and slide user interface (TSUI) may show the characters on the wheel 1130 with one character highlighted 1132 as the currently selected character. One or more previous and next characters in line may also be visible but not selected. The TSUI 1130 wheel smoothly moves through characters as the finger slides up and down.

When the second finger 1102 is lifted, the currently selected character is input to a data field in an application being executed by device 100.

In some implementations, sliding two fingers, such as the middle and ring finger together up and down may be used to rotate though an alternate group of characters. For example, sliding just one finger while holding down the index finger may trigger a character selection wheel of numeric characters, while sliding two fingers while holding down the index finger may trigger a character selection of math operations, static symbols, or alphabet characters, for example. A three finger slide (Middle, Ring, and Pinky fingers) may also be used to represent an additional index of character selections, for example.

In some cases, words or phrases may be placed on the wheel for selection.

The Thumb may also be used as a sliding finger to rotate through a list of characters alone or in combination with other sliding fingers, for example. Since the thumb essentially slides left and right, it may also be used to move the cursor, select text, or delete previous entries while the index finger remains in place on the screen, for example.

The user may lift all of the sliding fingers but hold down the index finger to "re-clutch" the wheel. Re-clutch means the user has moved the sliding fingers to the maximum limit and would like to re-center the fingers to continue the sliding motion to select characters at the far reaches of an index of characters.

Acceleration and speed of finger sliding motion may be used to control the rate of "spin" of the character selection wheel 1130.

The TSUI may allow a user to focus on the content and not on a distracting virtual keyboard, which allows easier selection and editing of data. This provides for easier and intuitive selection of an indexed list of items, for example: entry history, dictionary entries, list of students, list of files or media, etc., for example.

Figure 12:
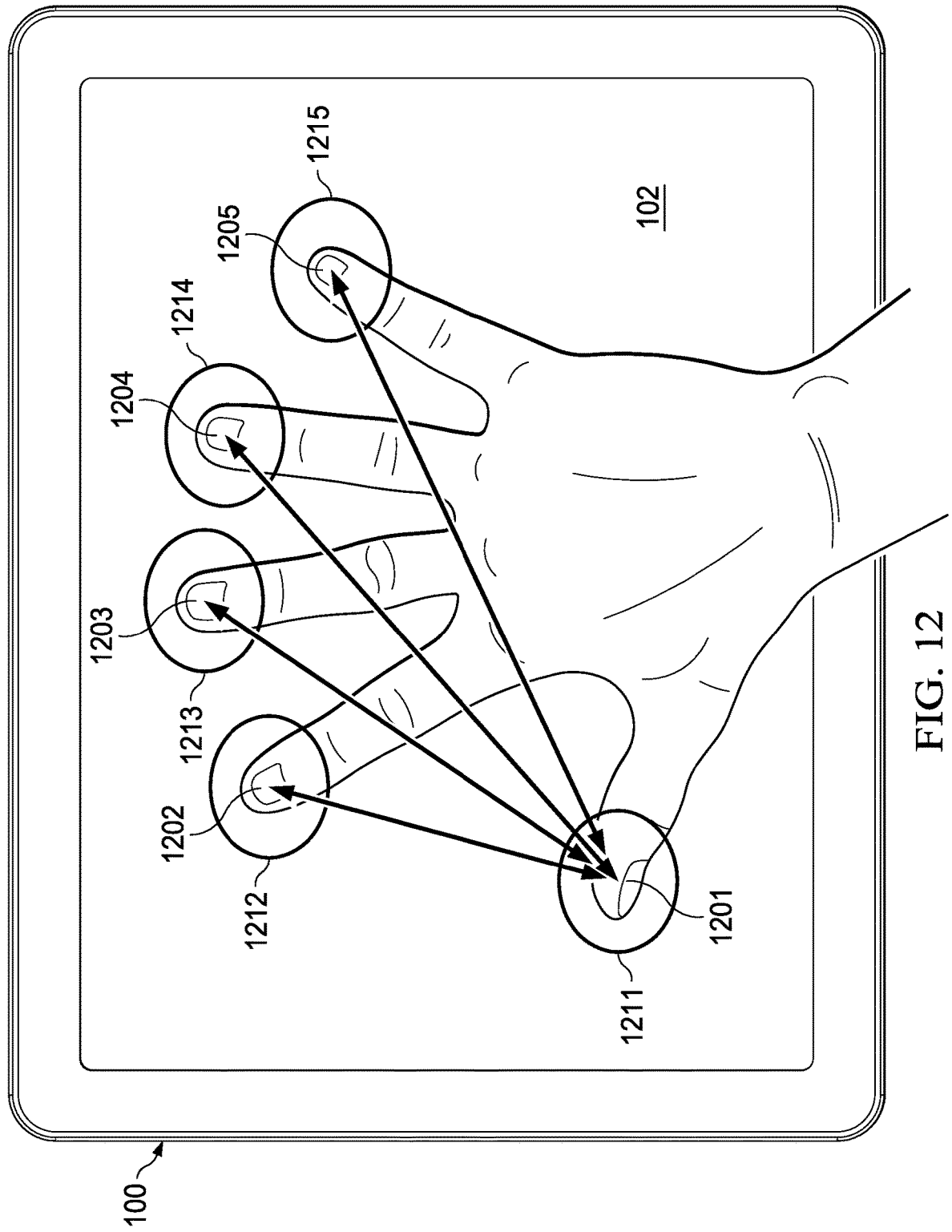
FIGS. 12-13 illustrate entering data into the device of FIG. 1 using chorded multiple fingers.
Figure 13:
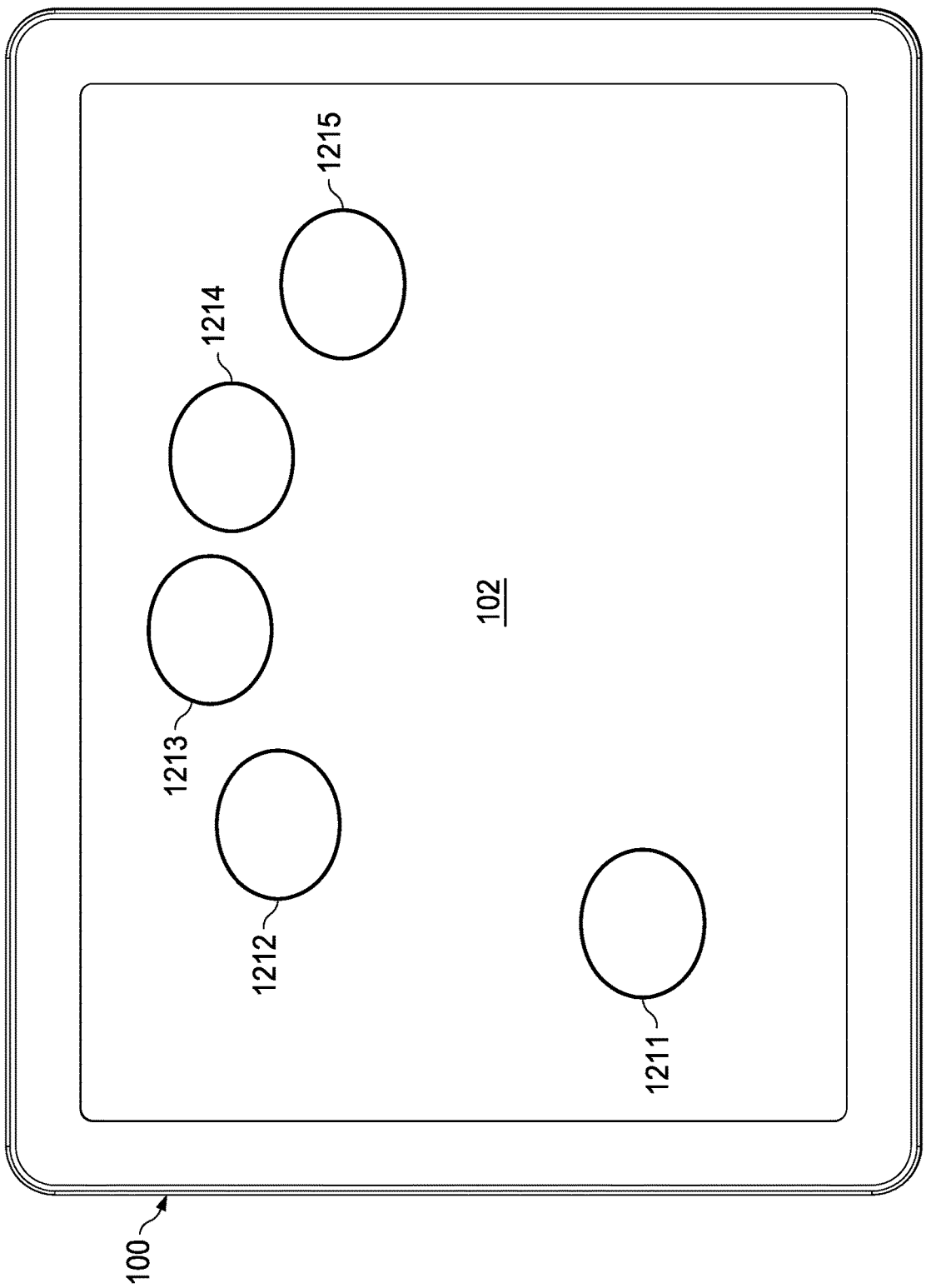

FIGS. 12-13 illustrate an alternative technique for entering data into the device of FIG. 1 using chorded multiple fingers. Tablet devices offer unique interface advantages, but the human interface for data entry is inferior to physical keys. The virtual keyboard takes up precious display space, and the keys are often squeezed tightly together. A chord based alpha numeric interface may be used for data entry into multi-touch devices. A user's fingers can serve as input digits. When one or more fingers touch the screen at the same time, the device may interpret these multi-tap inputs as an alphanumeric character or command.

Chorded input may be used for number entry and is well suited for calculator or spreadsheet applications; however, this chorded input is not limited to numeric input and may also be used for alphanumeric inputs. Numbers may be entered by taping one or more fingers on the screen to represent a binary number according to table 1. Software responsive to the touch screen may then interpret the binary number to a pre-mapped user focused input.

TABLE 1

| Binary Chorded input | | | | | | |
|---|---|---|---|---|---|---|
| K0 | K1 | K2 | K3 | K4 | Hex | Interpretation |
| 1 | 0 | 0 | 0 | 0 | 0 | Enters Number 0 |
| 1 | 0 | 0 | 0 | 1 | 1 | Enters Number 1 |
| 1 | 0 | 0 | 1 | 0 | 2 | Enters Number 2 |
| 1 | 0 | 0 | 1 | 1 | 3 | Enters Number 3 |
| 1 | 0 | 1 | 0 | 0 | 4 | Enters Number 4 |
| 1 | 0 | 1 | 0 | 1 | 5 | Enters Number 5 |
| 1 | 0 | 1 | 1 | 0 | 6 | Enters Number 6 |
| 1 | 0 | 1 | 1 | 1 | 7 | Enters Number 7 |
| 1 | 1 | 0 | 0 | 0 | 8 | Enters Number 8 |
| 1 | 1 | 0 | 0 | 1 | 9 | Enters Number 9 |
| 1 | 1 | 0 | 1 | 0 | A | Enters Plus Operator (+) |
| 1 | 1 | 0 | 1 | 1 | B | Enters Minus Operator (−) |
| 1 | 1 | 1 | 0 | 0 | C | Enters Divide Operator (/) |
| 1 | 1 | 1 | 0 | 1 | D | Enters Multiply Operator (*) |
| 1 | 1 | 1 | 1 | 0 | E | Enters the "Enter" key |
| 1 | 1 | 1 | 1 | 1 | F | Puts device in Entry Mode |

Input Key:
Thumb Finger = K0,
Index Finger = K1,
Middle Finger = K2,
Ring Finger = K3,
Pinky Finger = K4
"0" represents a finger that is not making contact to the touch screen.
"1" represents a finger that is making contact with the touch screen The general idea of a chorded keyboard is well known. Douglas Engelbart introduced the chorded keyset as a computer interface in 1968 at what is often called "The Mother of All Demos", as discussed in Wikipedia and elsewhere. However, when implemented on a touch sensitive screen, several improvements are possible. Referring to FIG. 12, the "F" input, in which all five fingers 1201-1205 on one hand touching the screen, can alert the device that data entry is about to happen. This may then cause the device to present a cursor, for example. This may also provide the software with an instant calibration on the user's hand size and finger separation, as indicated by areas 1211-1215.

In use, thumb 1201 may remain pressed down to give the chorded input detection software a better reference point to the user's hand size and prevent mis-taps. For each data entry, all active fingers must touch the screen at approximately the same time to denote a chord. A threshold delta time may be defined to specify touch times, typically allowing a few milliseconds of delta.

FIG. 13 illustrates a finger placement template that may be created based on a calibration step as discussed with regard to FIG. 12. The finger placement template may be used by the chorded input detection software to decide which finger position each detected tap should be assigned to. The area of each finger location 1211-1215 may be adjusted to allow a wider range of finger tap placement.

In some implementations, the finger placement template may not be visible to a user. In other implementations, the finger placement template may be shown as an overlay over an application window on display screen 102, for example.

In some implementations, the finger placement template may be dynamically recalibrated each time a user places all five fingers on the touch sensitive screen while in a chorded input application, for example.

Additional swipe commands and touch gestures may be used to toggle between entry modes: Numeric, Alpha, Static Characters, for example. A visual indicator may alert the user to which entry mode is active.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, embodiments are discussed described in which the digital devices may be a table computer. It should be noted, however, that other types of digital devices, e.g., laptop computers, desktop computers, and handheld computing devices may be used. Examples of other types of handheld computing devices include scientific calculators, advanced calculators able to upload and run software applications, handheld-sized limited-purpose computer devices, handheld-sized educational computer devices, handheld-sized portable computer devices, portable computer devices, personal digital assistants (PDA), palmtop computers, cellular or mobile telephones, and any combination thereof.

Embodiments of the invention may be used in calculators. Handheld calculators have progressed to be very sophisticated processing systems. A handheld calculator, such as the TI-Nspire™ from Texas Instruments, is capable of operating on one or more documents. In one version of such a calculator, each document may be divided into multiple problems. Each problem may contain many pages. Each page may be divided into several work areas. Each work area may contain any of the TI-Nspire™ applications: Calculator, Graph, Geometry, Lists & Spreadsheet, Data & Statistics, and Notes, for example.

Embodiments of multi-tap user interfaces may be used in conjunction with a calculation tool provided by the TI-Nspire™ and TI-Nspire™ CAS application programs. In other embodiments, a multi-tap user interface as described herein may be used in conjunction with calculation tools provided by other applications, such as Geogebra, MathStudio, PocketCAS, for example.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for entering data to a device, the method comprising:
displaying, by a processor, an underlying application on a touch sensitive display screen of the device;
detecting, by a processor, a first touch on a central region of the touch sensitive display screen of the device;
in response to the detecting the first touch on the central region of the touch sensitive display screen, displaying, by the processor, a template on the touch sensitive display screen, the template including a radial user interface that includes a plurality of radial regions referenced from the central region, wherein the template is overlaid on the underlying application, wherein the template includes the central region and the plurality of radial regions, and wherein the plurality of radial regions are displayed over the underlying application such that both the underlying application and the template are displayed on the touch sensitive display screen;
defining, by the processor, a location of the central region of the radial user interface;
determining, by the processor, an indication of a radial position responsive to a second touch on the touch sensitive display screen, wherein the second touch includes a radial swipe from the central region to one of the plurality of radial regions;
determining, by the processor, a value corresponding to the radial position of the second touch;
detecting, by the processor, a first slide of a third touch on the touch sensitive display screen while the first touch is held on the central region;
detecting, by the processor, a second slide, wherein the second slide includes the third touch with a fourth touch on the touch sensitive display screen while the first touch is held on the central region;
detecting, by the processor, a third slide, wherein the third slide includes the third touch with the fourth touch with a fifth touch on the touch sensitive display screen while the first touch is held on the central region;
in response to the first slide, display, by the processor, a first selection of characters in a virtual wheel, wherein display of the characters is controlled by the first slide;
in response to the second slide, display, by the processor, a second selection of characters in the virtual wheel, wherein display of the characters is controlled by the second slide;
in response to the third slide, display, by the processor, a third selection of characters in a virtual wheel, wherein display of the characters is controlled by the third slide;
determining, by the processor, a selected one of the first selection of characters in response to termination of the first touch on the touch sensitive display screen;
determining, by the processor, a selected one of the second selection of characters in response to termination of the first touch and the second touch on the touch sensitive display screen; and
determining, by the processor, a selected one of the third selection of characters in response to termination of the first touch, the second touch, and the third touch on the touch sensitive display screen.

2. The method of claim 1, wherein:
the first touch includes a single tap on the touch sensitive display screen.

3. The method of claim 1, wherein:
the first touch includes two simultaneous finger taps by a first finger and a second finger on the touch sensitive display screen; and
the second touch is associated with the second finger.

4. The method of claim 1, further comprising:
calibrating, by the processor, a size of a user's hand in response to detecting two simultaneous touches on the touch sensitive display screen.

5. The method of claim 4, wherein:
a first one of the simultaneous touches is in the central region of the touch sensitive display screen;
a second one of the simultaneous touches is a second region of the plurality of radial regions; and
the central region corresponds to a first finger tip position of a hand and the second region corresponds to a second finger tip position of the hand.

6. The method of claim 5, wherein:
the first finger tip position is a thumb tip position of the hand.

7. The method of claim 5, further comprising:
defining, by the processor, a first location for the central region and a second location for the second region based on the calibrating of the size of the user's hand.

8. The method of claim 1, wherein:
the template displays the plurality of radial regions and the central region with dashed lines.

9. The method of claim 1, wherein:
the template is centered on the touch sensitive display screen.

10. The method of claim 1, wherein:
the template is positioned at an edge of the touch sensitive display screen.

11. A non-transitory computer-readable medium storing software instructions that, when executed by a processor, cause the processor to:
display an underlying application on a touch sensitive display screen;
detect a first touch on a central region of the touch sensitive display screen;
in response to the detecting of the first touch on the central region of the touch sensitive display screen, display a template on the touch sensitive display screen, the template including a radial user interface that includes a plurality of radial regions referenced from the central region, wherein the template is overlaid on the underlying application, wherein the template includes the central region and the plurality of radial regions, and wherein the plurality of radial regions are displayed over the underlying application such that both the underlying application and the template are displayed on the touch sensitive display screen;
define a location of the central region of the radial user interface;
determine an indication of a radial position responsive to a second touch on the touch sensitive display screen, wherein the second touch includes a radial swipe from the central region to one of the plurality of radial regions;
determine a value corresponding to the radial position of the second touch;
detect a first slide of a third touch on the touch sensitive display screen while the first touch is held on the central region;
detect a second slide, wherein the second slide includes the third touch with a fourth touch on the touch sensitive display screen while the first touch is held on the central region;
detect a third slide, wherein the third slide includes the third touch with the fourth touch with a fifth touch on the touch sensitive display screen while the first touch is held on the central region;
in response to the first slide, display a first selection of characters in a virtual wheel, wherein display of the characters is controlled by the first slide;
in response to the second slide, display a second selection of characters in the virtual wheel, wherein display of the characters is controlled by the second slide;
in response to the third slide, display a third selection of characters in a virtual wheel, wherein display of the characters is controlled by the third slide;
determine a selected one of the first selection of characters in response to termination of the first touch on the touch sensitive display screen;
determine a selected one of the second selection of characters in response to termination of the first touch and the second touch on the touch sensitive display screen; and
determine a selected one of the third selection of characters in response to termination of the first touch, the second touch, and the third touch on the touch sensitive display screen.

12. The non-transitory computer-readable medium storing software instructions of claim 11, wherein:
the first touch includes a single tap on the touch sensitive display screen.

13. The non-transitory computer-readable medium storing software instructions of claim 11, wherein:
the first touch includes two simultaneous finger taps by a first finger and a second finger on the touch sensitive display screen; and
the second touch is associated with the second finger.

14. The non-transitory computer-readable medium storing software instructions of claim 11 further includes instructions that, when executed by the processor, cause the processor to:
calibrate a size of a user's hand in response to detecting two simultaneous touches on the touch sensitive display screen.

15. The non-transitory computer-readable medium storing software instructions of claim 14, wherein:
a first one of the simultaneous touches is in the central region of the touch sensitive display screen;
a second one of the simultaneous touches is a second region of the plurality of radial regions; and
the central region corresponds to a first finger tip position of a hand and the second region corresponds to a second finger tip position of the hand.

16. The non-transitory computer-readable medium storing software instructions of claim 15, wherein:
the first finger tip position is a thumb tip position of the hand.

17. The non-transitory computer-readable medium storing software instructions of claim 15 further includes instructions that, when executed by the processor, cause the processor to:
define a first location for the central region and a second location for the second region based on the calibrating of the size of the user's hand.

18. The non-transitory computer-readable medium storing software instructions of claim 11, wherein:
the template displays the plurality of radial regions and the central region with dashed lines.

19. The non-transitory computer-readable medium storing software instructions of claim 11, wherein:
the template is centered on the touch sensitive display screen.

20. The non-transitory computer-readable medium storing software instructions of claim 11, wherein:
   the template is positioned at an edge of the touch sensitive display screen.

* * * * *